No. 634,564. Patented Oct. 10, 1899.
E. L. SIBLEY.
EYELET.
(Application filed May 13, 1898.)

(No Model.)

Witnesses:
H. J. Roerth.
H. G. Homer.

Inventor
Edward L. Sibley
By
M. D. Peck
His Attorney

THE NORRIS PETERS CO., PHOTO-LITHO., WASHINGTON, D. C.

UNITED STATES PATENT OFFICE.

EDWARD L. SIBLEY, OF BENNINGTON, VERMONT.

EYELET.

SPECIFICATION forming part of Letters Patent No. 634,564, dated October 10, 1899.

Application filed May 13, 1898. Serial No. 680,585. (No model.)

*To all whom it may concern:*

Be it known that I, EDWARD L. SIBLEY, a citizen of the United States, residing at Bennington, in the county of Bennington and State of Vermont, have invented certain new and useful Improvements in Eyelets; and I do hereby declare the following to be a full, clear, and exact description of the invention, such as will enable others skilled in the art to which it appertains to make and use the same, reference being had to the accompanying drawings, which form part of this specification.

My invention relates to fastening devices or eyelets for fastening a plurality of layers of material together, the object being to provide a fastening of this character which may be easily applied and made a permanent fastener.

With these objects in view my invention consists of the several details of construction and arrangements of parts hereinafter described, and more particularly pointed out in the claim.

Figure 1:
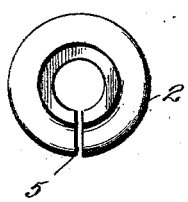
Figure 2:
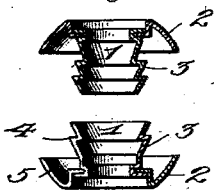
Figure 3:
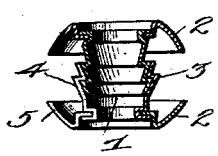
Figure 4:
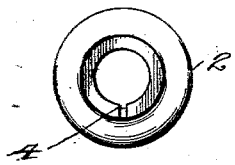

Referring to the drawings, Figure 1 is a plan view of the female member of my improved fastening device, showing one form of construction. Fig. 2 is a sectional view of the male and female members separated. Fig. 3 is a sectional view showing the members locked together. Fig. 4 is a plan view of one of the members, showing a modified form of construction.

Similar reference-numerals indicate corresponding parts in each figure of the drawings.

In all cases of my invention the device consists of two members each comprising a shank 1 with an annular flange 2 at one end, which will be termed the "head." The shanks are denominated "male" and "female"—that is, one is designed to fit within the other—and the shanks of both members are formed with a series of circumferential corrugations 3, adapted to interlock when the male shank is inserted within the female shank.

In Figs. 2 and 3 both shanks are tubular and the corrugations are angular, and one side of each corrugation lies in a plane at a right angle to the axis of the shank, while the other side is inclined thereto. This form of device is designed to make a permanent fastening, for when the right-angled sides of the corrugations of the two shanks are interlocked they cannot be easily separated. The head of each member is concave on its inner face and forms an acute angle with the axis of the shank. This is important, because when the two members are fitted together the opposing edges of the heads will be nearer to each other than other portions of the heads, and will consequently engage the material. As the members will be made of spring metal, the heads will yield under pressure, and thereby permit the fastener to accommodate itself to different thicknesses of material without impairing its clamping action, for such clamping action will always be effective as long as the inner face of the head does not form an angle greater than a right angle with the axis of the shank.

In order to permit the shanks to be interlocked, it is necessary that one or both be divided or split longitudinally, as indicated at 4, and the head may also be split, as indicated at 5.

In the construction shown in Figs. 2 and 3 the female member will preferably be split and the male member be integral throughout its circumference, and the female member may thus be expanded to permit the corrugations to be interlocked, and as the members will be made of spring metal the female member will naturally spring back into position. This form of fastener is adapted for papers, belt-fasteners, eyelets, and in all cases where it is not intended to remove them. The head of the female member is illustrated as being split, but this is not essential.

Having thus fully described my invention, what I claim as new, and desire to secure by Letters Patent, is—

A fastening device, comprising a male and a female member, each consisting of a shank and a head, the inner face of the latter extending at an acute angle to the axis of the shank, and one of said shanks being tubular and split and each having one or more circumferential corrugations formed in it intermediate its ends, one side of each corrugation being in a plane at a right angle to the axis of the shank and the other inclined thereto, as and for the purpose set forth.

In testimony whereof I have signed my name in presence of two witnesses.

EDWARD L. SIBLEY.

Witnesses:
HARRY T. FISHMAN,
E. H. HOLDEN.